US009697691B2

(12) United States Patent
Smith et al.

(10) Patent No.: US 9,697,691 B2
(45) Date of Patent: Jul. 4, 2017

(54) EXCLUSIVELY MATCH SYMBOL VIDEO GAMING

(71) Applicants: Ray Smith, Linden, NJ (US); Amanda Tears Smith, Linden, NJ (US)

(72) Inventors: Ray Smith, Linden, NJ (US); Amanda Tears Smith, Linden, NJ (US)

( * ) Notice: Subject to any disclaimer, the term of this patent is extended or adjusted under 35 U.S.C. 154(b) by 110 days.

(21) Appl. No.: 13/621,853

(22) Filed: Sep. 18, 2012

(65) Prior Publication Data

US 2014/0080568 A1 Mar. 20, 2014

(51) Int. Cl.
*A63F 13/00* (2014.01)
*G07F 17/32* (2006.01)

(52) U.S. Cl.
CPC .................................. *G07F 17/326* (2013.01)

(58) Field of Classification Search
CPC ..................................................... G07F 17/326
USPC ..................................................... 463/10-13
See application file for complete search history.

(56) References Cited

U.S. PATENT DOCUMENTS

2005/0020344 A1* 1/2005 Kaminkow ..................... 463/16
2005/0151319 A1* 7/2005 Berman et al. ............... 273/292
2012/0202579 A1* 8/2012 Olsen .............................. 463/20

OTHER PUBLICATIONS

"Rules of Poker" posted on http://web.archive.org/web/20060225095834/http://www.contrib.andrew.cmu.edu/~gc00/reviews/pokerrules on Feb. 26, 2006.*
Frank Scoblete, Victory at Video Poker and other video games, Bonus Books, Inc. Chicago, Illinois, a995, pp. 29-53, 114-117 and 140-145.

* cited by examiner

*Primary Examiner* — Omkar Deodhar
*Assistant Examiner* — Ross Williams
(74) *Attorney, Agent, or Firm* — Mark A. Litman & Associates, P.A.

(57) ABSTRACT

A game play on an electronically based system utilizes symbol collection outcomes along paylines to determine winning events in a virtual game. Even when the symbols used in the virtual game comprise or consist of playing cards displaying conventional ranks, suits and symbols, winning outcomes are determined only by accumulation of sets of symbols, without regard to linear order (straights and straight flushes) and random symbols within a suit (flushes). Accumulated symbols in an at least five symbols display game event as pairs, trips (three-of-a-kind), two pairs, full houses (three of one symbol plus two of a different symbol), four-of-a-kind and five-of-a-kind are determined to be winning events, while a flush, straight and even straight flushes may be or are required to be ignored. Optional and even preferred additional events are used in a draw poker variant (with playing card symbols or non-playing card symbols are used in an accumulated symbol gaming event).

19 Claims, 3 Drawing Sheets

FIGURE 3

A

| | | | | |
|---|---|---|---|---|
| a | b | b | c | d |

| | | | | |
|---|---|---|---|---|
| f | W | b | g | f |

B

| | | | | |
|---|---|---|---|---|
| a | b | b | b | d |

| | | | | |
|---|---|---|---|---|
| A | W | W | b | a |

C

| | | | | |
|---|---|---|---|---|
| a | b | b | c | a |

| | | | | |
|---|---|---|---|---|
| g | W | b | f | f |
| h | | | g | b |

D

| | | | | |
|---|---|---|---|---|
| J | 5 | 10 | 3 | 7 |

| | | | | |
|---|---|---|---|---|
| Q | Q | 3 | J | 3 |
| | 3 | 7 | 9 | |

EXCLUSIVELY MATCH SYMBOL VIDEO GAMING

BACKGROUND OF THE INVENTION

1. Field of the Invention

The present invention relates to video gaming, video gaming apparatus and specific variants of symbol games played on video gaming apparatus.

2. Background of the Art

Video gaming is a major revenue source for the gaming industry. A wide variety of games is played on stand-alone slot-type machines, banks of machines, networked machines, on-line systems and the like that make up the genus of video gaming. A common denominator among these games is the use of a housing, a video monitor, processor, wager input system and a player input control system. The housing need not include all of the components, as where a housing includes a video display, processor and wager input system that is accessed through a transmitting and receiving system that can communicate with the processor to assist in game play. The rules of an individual game or various games are stored in memory and the game is played by execution of code by the processor and display of images on the video display.

Common games played are virtual variants of slot machine games (e.g., 3×3, 3×5, 5×5, etc., displays of symbols forming paylines), poker variants (stud poker, draw poker, 3-card, 4-card or 5-card poker), keno, bingo, blackjack and the like.

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A “processor” means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term “computer-readable medium” refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In some embodiments, a server computer and one or more client computers may perform desired actions. Actions may be performed by one or more of the clients and/or servers in accordance with a desired distribution of labor. Such distribution of labor may be made based on where the actions may be performed more securely, more quickly, and/or more cost-effectively. For example, in some implementations, complex calculations may be performed by a central server to increase speed, display related calculations may be performed by a client because they may be simple, outcome determining calculations may be performed by a central server in order to ensure the validity of the calculations and allow tweaking of odds to be performed at a single location. It should be recognized that any desired actions may be divided among a server and any number of clients in any desired way.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by “scratching off” an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

Basic Rules of Standard 5-Card Poker

In a basic poker game, which is played with a standard 52-card deck, each player is dealt five cards. All five cards in each player’s hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player’s hand. Regardless of the number of cards in a player’s hand, the values assigned to the cards, and the odds, the method of evaluating all five cards in a player’s hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a ‘dealer’ button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players’ hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker Players each receive five—as in five-card draw—or more cards, all of which are hidden. They can then replace one or more of these cards a certain number of times.

Stud Poker Players receive cards one at a time, some being displayed to other players at the table. The key difference between stud and ‘draw’ poker is that in stud poker players are not allowed to discard or replace any cards.

Community Card Poker Players combine individually dealt cards with a number of “community cards” dealt face up and shared by all players. Two or four individual cards may be dealt in the most popular variations, Texas hold’em and Omaha hold’em, respectively. Poker Hand Rankings Straight Flush A straight flush is a poker hand such as Q J 10 9 8, which contains five cards in sequence, all of the same suit. Two such hands are compared by their high card in the same way as are straights. The low ace rule also applies: 5.diamond-solid. 4.diamond-solid. 3.diamond-solid. 2.diamond-solid. A.diamond-solid. is a 5-high straight flush (also known as a “steel wheel”). An ace-high straight flush such as A K Q J 10 is known as a royal flush, and is the highest ranking standard poker hand (excluding five of a kind).

Four of a Kind

Four of a kind, or quads, is a poker hand such as 9 9 9.diamond-solid. 9 J, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Full House

A full house, also known as a boat or a full boat, is a poker hand such as 3 3 3.diamond-solid.6 6, which contains three matching cards of one rank, plus two matching cards of another rank. It ranks below a four of a kind and above a flush. Between two full houses, the one with the higher ranking set of three wins. If two players have the same set of three (possible in wild card and community card games), the hand with the higher pair wins. Full houses are described by the three of a kind (e.g. Q-Q-Q) and pair (e.g. 9-9), as in “Queens over nines” (also used to describe a two pair), “Queens full of nines” or simply “Queens full”.

Flush

A flush is a poker hand such as Q 10 7 6 4, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in “queen-high flush”.

Straight

A straight is a poker hand such as Q J 10 9 8, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in “queen-high straight” or “straight to the queen”.

A hand such as A K Q J 10 is an ace-high straight, and ranks above a king-high straight such as K Q J 10 9. But the ace may also be played as a 1-spot in a hand such as 5 4.diamond-solid. 3.diamond-solid. 2 A, called a wheel or five-high straight, which ranks below the six-high straight 6 5 4 3 2. The ace may not “wrap around”, or play both high and low in the same hand: 3 2.diamond-solid. A K Q is not a straight, but just ace-high no pair.

SUMMARY OF THE INVENTION

The present invention utilizes symbol collection outcomes along paylines to determine winning events in a virtual game. Even when the symbols used in the virtual game comprise or consist of playing cards displaying conventional ranks, suits and symbols, winning outcomes are determined only by accumulation of sets of symbols, without regard to linear order (straights and straight flushes) and random symbols within a suit (flushes). Accumulated symbols in an at least five symbols display game event as pairs, trips (three-of-a-kind), two pairs, full houses (three of one symbol plus two of a different symbol), four-of-a-kind and five-of-a-kind are determined to be winning events, while a flush, straight and even straight flushes may be or are required to be ignored. Optional and even preferred additional events are used in a draw poker variant (with playing card symbols or non-playing card symbols are used in an accumulated symbol gaming event).

BRIEF DESCRIPTION OF THE FIGURES

FIG. 3 shows a series of screen images A, B, C and D in which initial payline sets of symbols are shown and then final payline sets of symbols after various discard and replacement scenarios.

DETAILED DESCRIPTION OF THE INVENTION

Figure 1A:
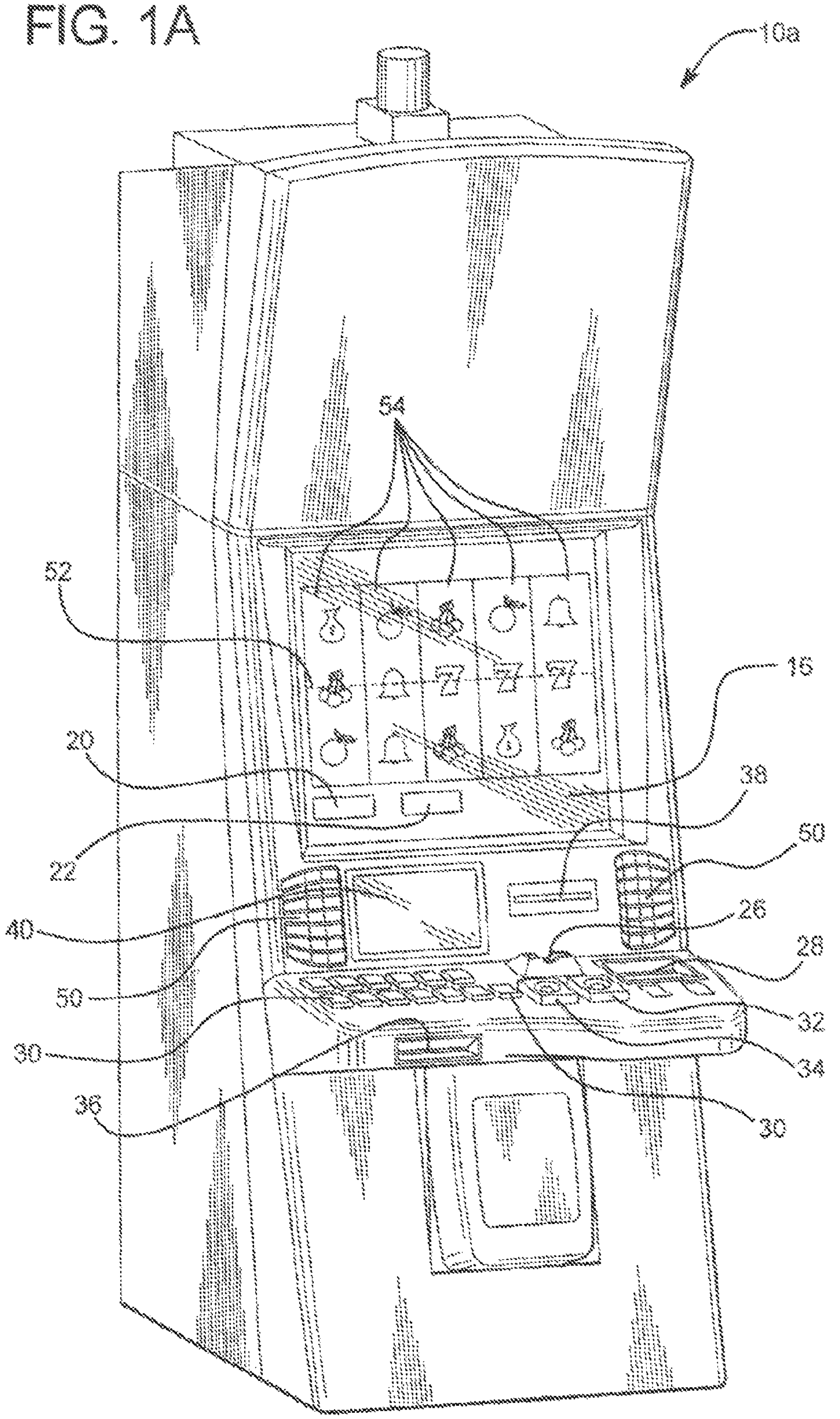
FIG. 1A shows a perspective view of a stand-alone video gaming machine on which games of the present invention may be played.

The present invention includes a process for playing a game, particularly a single event allowing a discard and replacement event in a symbol accumulation game on a video gaming apparatus that has a housing, a video display device, a processor, player wager input system and player selection input system. The process may include steps of:

a) the processor recognizing existence of a wager on the game;

b) the processor randomly selecting a first subset of symbols from a first set of symbols to leave a residual set of symbols, the subset of symbols being a smaller number than the first set of symbols;

c) the processor providing signals to the video display device to display images of the symbols selected in b);

d) the processor recognizing signals input to the player input system to discard some, none or all individual symbols from the first subset of symbols;

e) optionally the processor performs a step of shifting or rearranging the displayed order of the held symbols so that all held symbols shift to the left and all replacement symbols for discarded symbols appear to the right of the held symbols;

f) the processor randomly selecting at least one symbol from the residual set of symbols to replace any symbols indicated by signals to be discarded in d) to form a final set of game symbols; and g) the processor identifying winning and losing outcomes based upon only combinations of pairs of symbols, three-of-a-kind of symbols, two pairs of symbols, a combination of three-of-a-kind of symbols and a pair of symbols, four-of-a-kind of a symbol and five-of-a-kind of a symbol.

The process may allow that a single symbol (or each symbol) discarded in d) is replaced by two symbols randomly selected from the residual set of symbols. Rules may limit the number of replacement symbols (cards) that may be provided as two symbols (cards) for each discarded symbol (card). For example, the rules may limit a single discard, two discards, three discards or four discards to double symbol replacement. In the process, a preferred method may provide that exactly five symbols are provided as the first set of symbols. The processor may be programmed and configured to then automatically select the most advantageous symbol in each double symbol replacement set to “hold” to give the player the best possible final hand. The player may be allowed to have only a single “best” payline from among the various available alternative paylines where multiple replacement symbols have been provided, or the player may be allowed to use all theoretic paylines using the multiple replacement symbols at a specific position with the held or saved original symbols.

The process may have the symbols consist of playing card symbols selected from A, 2, 3, 4, 5, 6, 7, 8, 9, 10 J, Q and K, or the symbols may include joker(s) or special event cards or symbols. In one variant of the process, when there are two consecutively displayed symbols in the first set of symbols that are the same symbol, one of the consecutively displayed symbols is converted by the processor to a wild symbol. Another variant in the process is that when three consecutively displayed symbols in the first set of symbols are the same symbol, two of the consecutively displayed symbols are converted by the processor to a wild symbol.

Alternatively in the process, when two consecutively displayed symbols in the first set of symbols are the same symbol, a replacement symbols is regarded by the processor as a wild symbol.

FIG. 1 shows a general gaming cabinet 10*a* with such standard components as the game display panel 16 having five columns 54 and a major payline row 52. A currency slot 38 and card slots 36 and 28 (for credit cards, player cards, currency, printed slip insertion/emission) provided. Player control buttons 30 are shown although the display panel may also have touch screen functionality. The gaming cabinet 10*a* usually has a fixed, inactive, or active non-game display panel on a top box in which advertising, game rules, payout tables, animated awards or service notices etc. may be provided. Speakers 50, central display screen 40, coin insert 26, additional control buttons 32 and 34, credit display 20 and wager display 22 are also shown.

Figure 2A:
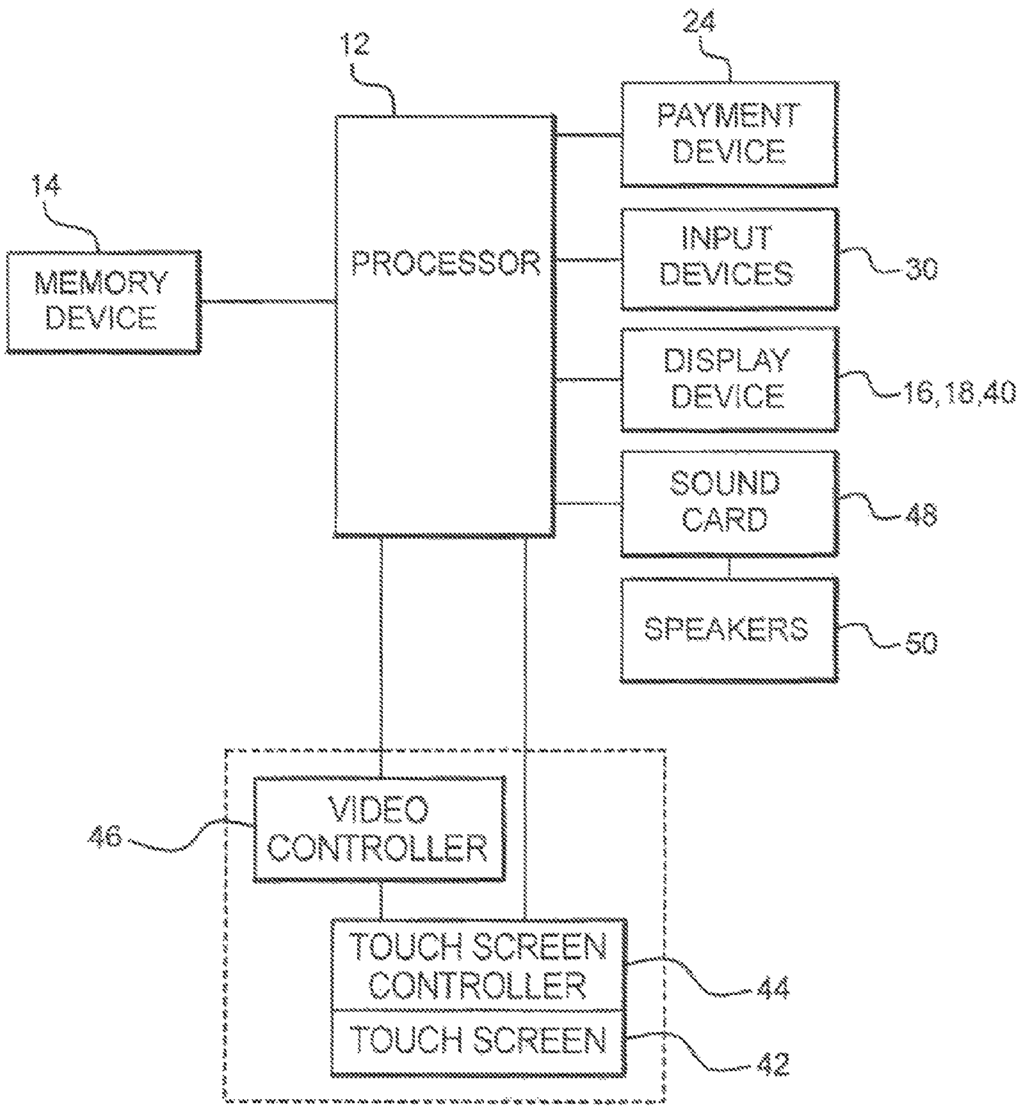
FIG. 2A shows a schematic diagram of a gaming system on which games of the present invention may be played.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC’s). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The upper display device may display the primary game, any suitable secondary game associated or not associated with the primary game and/or information relating to the primary or secondary game. These display devices may also serve as digital glass operable to advertise games or other aspects of the gaming establishment. As seen in FIG. 1A, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

An exemplary electrical architecture that may be used with gaming machines may include a gaming machine controller having a processor communicatively coupled a memory area. Moreover, in the exemplary embodiment, processor and memory area reside within cabinet (shown in FIG. 1) and may be collectively referred to herein as a "computer" or "controller." Controllers communicate with one or more other gaming machines or other suitable devices via a network interface. Processor may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory areas store program code and instructions, executable by a processor, for controlling gaming machines. For example, memory area stores data such as image data, event data, player input data, random or pseudo-random number generation software, paytable data, and/or other information or applicable game rules that relate to game play on gaming machine. Moreover, memory area may include one or more forms of memory. For example, memory areas can include random access memory (RAM), read-only memory (ROM), flash memory, and/or electrically erasable programmable read-only memory (EEPROM). In some embodiments, other suitable magnetic, optical, and/or semiconductor-based memory may be included in memory areas by itself or in combination.

In the exemplary embodiment, gaming machine may include a credit display, which displays a player's current number of credits, cash, account balance or the equivalent. Gaming machine also includes a bet display which displays a player's amount wagered. Credit display and bet display may be standalone displays independent of display device, or credit display and bet display may be incorporated into display device. As described in additional detail below, display device can display game play using a single frame, including a single credit display and a single bet display. In addition, display device can display game play using a plurality of frames by splitting or dividing the original, single frame. Each of the newly formed frames can include a respective credit display and bet display. Moreover, as described in additional detail below, the credits associated with each of the multiple frames is drawn from the same available credit pool as the credit displayed on the original, single frame. Accordingly, credit display and bet display associated with the multiple frames operate substantially the same as credit display and bet display associated with the single frame.

A gaming apparatus can be provided as a housing, a video display device, a processor, player wager input system and player selection input system, wherein the processor is configured to execute code to perform the processes described herein. In the apparatus, traditional player input systems and more modern input systems for wagers and game control events such as buttons, joy sticks, voice controls, keyboards, data entry devices (PDA, iPhone, cell phone, pads, tablets) and touchscreens. The last are enabled in the art, for example, by U.S. Pat. No. 5,951,397 to Dickinson, entitled "Gaming Machine and Method Using Touch Screen," described a gaming machine having a touch screen applied to an outer face of a cathode ray tube (CRT). The touch screen comprised a transparent panel (touch panel) which was curved and shaped to correspond to the curvature and shape of the CRT screen surface to which it was applied. U.S. Pat. No. 5,796,389 to Bertram et al., entitled "Reduced Noise Touch Screen Apparatus and Method," described a touch screen apparatus including four electrodes, each in the shape of a conductive bus bar, that were positioned along the edges of the touch screen. Four conductive wires were coupled to electrodes. The four electrodes could be silk screen directly onto a screen of a display (e.g., a CRT), and a conductive coating could be applied over the electrodes and the screen of the display. A sinusoidal signal was applied to the electrodes via the conductive wires. When a person touched the conductive coating, a small amount of current would flow from the electrodes, through the person's body, and to ground. The amount of current flowing from a given electrode was generally dependent upon the distance of the touch position from the given electrode. Thus, the amount of current flowing through each of the electrodes was used to calculate a position of a touch. U.S. Pat. No. 7,855,717 (Mattice) describes a method for determining a position of a touch on a touch screen, a first sinusoidal signal is provided to an electrode on a touch screen, the first sinusoidal signal having a frequency. A signal flowing from the first electrode is sensed to generate a sensed signal, and the sensed signal is multiplied by a second sinusoidal signal to generate a first multiplied signal, the second sinusoidal signal having the frequency, the second sinusoidal signal having a phase. The first sensed signal is also multiplied by a third sinusoidal signal to generate a second multiplied signal, the third sinusoidal signal having the frequency, the third sinusoidal signal having a phase different from the phase of the second sinusoidal signal by 90 degrees. The first multiplied signal is filtered to generate a first filtered signal, and the second multiplied signal is filtered to generate a second filtered signal. An estimated touch position is generated based on the first filtered signal and the second filtered signal.

When two symbols are provided as a replacement for a single discarded symbol, this creates a potential for multiple paylines being created where there had previously been only a single payline. The processor and software may be configured to allow all of the newly created paylines (and some would be non-linear) to be used in resolving awards, or the processor may be programmed and configured to review all of the paylines, and then the processor resolves the wager against a single payline (determined by the processor) having a most reward advantageous combination of symbols including only one of the two symbols that have been randomly selected for the single symbol discarded. Thus if the two replacement symbols were a cherry and a bonus symbol completing a bonus award, even though the cherry might return 2 credits on the wager, the processor ignores that payline (under this latter alternative resolution process) and pays on only the higher paying bonus event.

The processor in the housing also may be in communication with the player input position by way of wireless connections or plug-in connections. The communication may be over the internet through a wide area server or communications system, or may be directly through an authorized connection with the main server or main processor. For example, individual PDA's, iPhone, Droids, phones, iPads and the like may be in communication with the game processor through an authorizing system. The casino may even provide handheld devices that are dedicated or engaged with the system and report through the main game controller by recognition of the device AND using an individual player's authenticating identification (such as a player card, credit card, hotel registration card, and the like).

Although specific examples, specific components and specific symbols are used in this description, there are enabling disclosure of specific embodiments within the generi concepts of the present invention and should not limit the claims except where recited therein.

The invention claim is:

1. A process for playing a game on a video gaming apparatus that comprises a housing, a video display device, a processor, player wager input system and player selection input system, wherein the process comprises:

a) the processor recognizing existence of a wager on the game based on credit input to the video gaming apparatus through a receptor slot and credited to the processor from credit cards, player cards, currency, or printed slip insertion/emission provided into the receptor slot;

b) the processor randomly selecting a first subset of symbols from a first set of symbol to leave a residual set of symbols, the subset of symbols being a smaller number than the first set of symbol;

c) the processor providing signals to the video display device to display images of the symbols selected in b);

d) the processor recognizing signals input to the player input system to discard some, none or all individual symbols from the first subset of symbols;

e) the processor randomly selecting at least one symbol from the residual set of symbols to replace any symbols indicated by signals to be discarded in d) to form a final set of game symbols; and f) the processor identifying winning and losing outcomes based upon only combinations of pairs of symbols, three-of-a-kind of symbols, two pairs of symbols, a combination of three-of-a-kind of symbols and a pair of symbols, four-of-a-kind of a symbol and five-of-a-kind of a symbol and crediting winning outcomes to the processor.

2. The process of claim 1 wherein a single symbol discarded in d) is replaced by two symbols randomly selected from the residual set of symbols.

3. The process of claim 2 wherein exactly five symbols are provided as the first set of symbols.

4. The process of claim 3 wherein the symbols consist of playing card symbols selected from A, 2, 3, 4, 5, 6, 7, 8, 9, 10, J, Q and K.

5. The process of claim 3 wherein the symbols consist of playing card symbols selected from A, 2, 3, 4, 5, 6, 7, 8, 9, 10, J, Q, K and jokers.

6. The process of claim 1 wherein when two consecutively displayed symbols in the first set of symbols are the same symbol, one of the consecutively displayed symbols is converted by the processor to a wild symbol.

7. The process of claim 4 wherein when two consecutively displayed symbols in the first set of symbols are the same symbol, one of the consecutively displayed symbols is converted by the processor to a wild symbol.

8. The process of claim 5 wherein when two consecutively displayed symbols in the first set of symbols are the same symbol, one of the consecutively displayed symbols is converted by the processor to a wild symbol.

9. The process of claim 1 wherein when three consecutively displayed symbols in the first set of symbols are the same symbol, two of the consecutively displayed symbols are converted by the processor to a wild symbol.

10. The process of claim 4 wherein when three consecutively displayed symbols in the first set of symbols are the same symbol, two of the consecutively displayed symbols are converted by the processor to a wild symbol.

11. The process of claim 5 wherein when three consecutively displayed symbols in the first set of symbols are the same symbol, two of the consecutively displayed symbols are converted by the processor to a wild symbol.

12. The process of claim 4 wherein a single symbol discarded in d) is replaced by two symbols randomly selected from the residual set of symbols.

13. The process of claim 7 wherein a single symbol discarded in d) is replaced by two symbols randomly selected from the residual set of symbols.

14. The process of claim 8 wherein a single symbol discarded in d) is replaced by two symbols randomly selected from the residual set of symbols.

15. The process of claim 3 wherein when two consecutively displayed symbols in the first set of symbols are the same symbol, a replacement symbols is regarded by the processor as a wild symbol.

16. The process of claim 4 wherein when two consecutively displayed symbols in the first set of symbols are the same symbol, a replacement symbols is regarded by the processor as a wild symbol.

17. The process of claim 3 wherein when three consecutively displayed symbols in the first set of symbols are the same symbol, a replacement symbols is regarded by the processor as a wild symbol.

18. The process of claim 3 wherein each single symbol discarded in d) is replaced by the processor with two symbols randomly selected from the residual set of symbols and the processor resolves the wager against a single payline having a most reward advantageous combination of symbols including only one of the two symbols that have been randomly selected for the single symbol discarded.

19. The process of claim 7 wherein each single symbol discarded in d) is replaced by the processor with two symbols randomly selected from the residual set of symbols and the processor resolves the wager against a single payline having a most reward advantageous combination of symbols including only one of the two symbols that have been randomly selected for the single symbol discarded.

* * * * *